United States Patent

Wallenwein et al.

Patent Number: 5,502,109
Date of Patent: Mar. 26, 1996

[54] PROCESS FOR THE PRODUCTION OF HEAT-STABLE MOLDINGS USEFUL AS A FRICTION LINING FOR GRINDING TOOLS

[75] Inventors: Siegfried Wallenwein, Buettelborn; Richard Sattelmeyer, Wiesbaden, both of Germany

[73] Assignee: Hoechst Aktiengesellschaft, Germany

[21] Appl. No.: 360,393

[22] Filed: Dec. 21, 1994

[30] Foreign Application Priority Data

Dec. 23, 1993 [DE] Germany .................. 43 44 133.5

[51] Int. Cl.$^6$ ................................. C08L 9/06
[52] U.S. Cl. .................. 525/141; 523/149; 523/156; 524/511; 525/139
[58] Field of Search .................. 525/139, 141, 525/140

[56] References Cited

U.S. PATENT DOCUMENTS

| | | | |
|---|---|---|---|
| 4,316,827 | 2/1982 | Pacala | 525/141 |
| 4,320,823 | 3/1982 | Covaleski | 525/141 |
| 4,725,650 | 2/1988 | Landi | 525/138 |

FOREIGN PATENT DOCUMENTS

| | | |
|---|---|---|
| 1669865 | 6/1971 | Germany . |
| 2708707 | 9/1978 | Germany . |
| 892462 | 3/1962 | United Kingdom . |

OTHER PUBLICATIONS

Copy of Derwent Abstract (1 page) AN–93–293509 (37).

*Primary Examiner*—Christopher Henderson
*Attorney, Agent, or Firm*—Bierman and Muserlian

[57] ABSTRACT

Heat-stable moldings for brake linings, clutch linings and grinding tools are produced by molding and vulcanizing a mixture containing a natural or synthetic rubber in the presence of a sulfur-free vulcanizer/activator system comprising phenol resols which contain at least 90 mol % of p-($C_3$–$C_{12}$)-alkylphenols, based on the total amount of phenols, and a substance, or mixture of substances, which acts as a Brønsted or Lewis acid under the reaction conditions of the rubber-vulcanization, at a temperature of 120° to 250° C.

8 Claims, No Drawings

5,502,109

PROCESS FOR THE PRODUCTION OF HEAT-STABLE MOLDINGS USEFUL AS A FRICTION LINING FOR GRINDING TOOLS

The present invention relates to a process for the production of heat-stable moldings which contain natural or synthetic rubber in the presence of a sulfer-free vulcanizer/activator system as a binder, and moldings produced by this process and the use of said moldings as friction linings.

STATE OF THE ART

A heat-stable molding, for example, a modern brake lining, has to meet essentially the following requirements:

uniform frictional behavior under all operating conditions, in particular when temperature and braking pressure increase, small fluctuations in friction (no jerking), high heat resistance, low heat transfer, good fatigue strength at elevated temperatures, little abrasive wear on brake drum or brake disk, low noise level, insensitivity to changing weather conditions, freedom from corrosion, resistance to drive materials and hydraulic fluids, environment-friendly and economical production while avoiding occupational hygiene problems and environment-friendly and economical disposal.

In general, friction lining formulations are composed of the following principal raw material groups:

| | |
|---|---|
| a) inorganic and/or organic fibers: for example glass, basalt, ceramic, diabase, Aramid, carbon, textile, metal fibers | preferably 20–60% by weight |
| b) inorganic or organic fillers: for example barite, kaolin, magnesium oxide, calcium oxide, alumina, "friction dusts", carbon blacks | preferably 5–40% by weight |
| c) metals (powder, turnings, wool): for example brass, iron, copper | preferably 5–60% by weight |
| d) Lubricants: for example antimone sulfide, molybdenum disulfide, graphite | preferably 0–5% by weight |
| e) binders: phenol resins and/or rubber | preferably 5–40% by weight |
| f) vulcanizing agents, curing agents and accelerators: sulfur, hexamethylenetetramine, benzothiazyl-2-cyclohexyl-sulfenamide | preferably 1–10% by weight |
| g) if required, solvents: for example alcohols. | |

The binder used in a major importance for bonding such heterogeneous mixtures. The publication EP-B 0 248 980 proposes, as binders for molding materials stable to high temperatures, special phenol/formaldehyde novolaks which have a low formaldehyde content and are cured with hexamethylenetetramine. The publication EP-B 176 193 discloses friction materials in which self-curing phenol resols are used as binders. These moldings bound exclusively by means of phenol resin are distinguished by great hardness but have relatively low resilience, so that, owing to their brittleness, problems arise during processing and in the event of changing loads in operation.

The modification of friction materials based on phenol resin binders by means of vulcanized rubber particles in the form of rubber wastes or latex without additional vulcanizing agents has an advantageous effect on the frictional behavior, said modification being described in DE-A 39 39 481 and DE-C 29 32 647. However, a substantial improvement in the resilience of the molding cannot be achieved by this means since these moldings, too, are after all bound exclusively by means of phenol resins.

With the concomitant use of an elastomer latex material, DE-C 34 23 163 proposes, for friction linings, a binder system comprising a butadiene/styrene/vinylpyridine copolymer and a resorcinol/formaldehyde resin. DE-C 28 32 464, too, uses a multicomponent system comprising phenol resins and rubber as a binder for brake linings. Many of the requirements set for friction linings are substantially met by these systems. However, a great disadvantage of these rubber-containing binder systems is that the vulcanization of the rubber is effected by sulfur. Owing to the annoying odor due to the sulfur, the processing procedure gives rise to occupational hygiene problems. Moreover, accelerators have to be used in the vulcanization with sulfur. However, when highly effective accelerators containing secondary amine structures are used, there is a danger of the formation of nitrosamines. Furthermore, the moldings, which contain rubber binders vulcanized by means of sulfur, suffer a considerable aging-related decline in the originally present resilience (comparative experiment).

It is known in principle that phenol resins blocked in the p-position can be used instead of sulfur for vulcanizing rubber (Rubber Chemistry and Technology, Vol. 62, page 107 et sec., 1988).

None of the processes known to date for the production of heat-stable moldings leads to products which optimally meet all requirements which are desired by the customers particularly when the moldings are used as brake linings. In particular, the required combination of hardness and resilience of the moldings in combination with high heat resistance is not known in the prior art.

OBJECTS OF THE INVENTION

It was therefore the object of the present invention to provide a process which permits the production of heat-stable moldings having improved mechanical properties with the use of natural or synthetic rubber binders, without the vulcanization with sulfur which is otherwise usual.

SUMMARY OF THE INVENTION

According to the invention, the binder used for the molding is a natural or synthetic rubber with a vulcanizer/activator system which comprises a resol blocked in the p-position with a ($C_3$–$C_{12}$)-alkyl radical and a substance, or mixture of substances, which acts as a Brønsted or Lewis acid under the reaction conditions. Surprisingly, substantially better mechanical properties of the moldings are achieved when, instead of sulfur, p-alkylphenol resols are used as vulcanizing agents.

The present invention therefore relates to a process for the production of heat-stable moldings by molding and vulcanizing a mixture containing natural or synthetic rubber in the presence of a sulfur-free vulcanizer/activator system comprising phenol resols which contain at least 90 mol % of p-($C_3$–$C_{12}$)-alkylphenols, based on the total amount of phenols, and the substance, or mixture of substances, which acts as a Brønsted or Lewis acid under the reaction conditions of the rubber vulcanization, at a temperature of from 120° to 250° C.

In the process according to the invention, the rubber grades used are preferably natural and/or synthetic rubbers which are known to be resistant to heat and chemicals. For example, natural rubber, nitrile rubber, butyl rubber, chlorobutyl rubber, polychloroprene, ethylene-propyleneterpolymer and, preferably, styrene-butadiene rubber and copolymers of butadiene and acrylo-nitrile are suitable.

The amount of the rubber binder is from 5 to 50% by weight, preferably from 8 to 30% by weight, in particular from 10 to 20% by weight, based on the amount of the nonvolatile components used for the production of the molding.

For the vulcanization of the rubber components, preferably p-$(C_4-C_{10})$-alkylphenol resols, in particular p-$(C_4-C_8)$-alkylphenol resols, are used. These p-alkylphenol resols can be prepared by known methods, by condensation of suitable alkylphenols with aldehydes, preferably with formaldehyde, preferably in the presence of basic catalysts. The aldehyde component is present in the p-alkylphenol resols always in excess, based on the particular molar amount, compared with p-alkylphenol.

Suitable p-alkylphenols used in the p-alkylphenol resols are, for example, p-isopropylphenol, p-tert-butylphenol, p-hexylphenol, p-tert-octylphenol, p-(2-ethylhexyl)phenol and p-nonylphenol. The p-alkylphenols may additionally be partly substituted by chlorine or bromine. Some of the methylol groups present in the p-alkylphenol resol used may also be replaced by halomethyl groups, in particular chloromethyl or bromomethyl groups.

Unsubstituted phenol may also be present in the p-alkylphenol resols, in an amount of less than 10 mol %, in particular of less than 5 mol %, based on the total amount of phenols.

The amount of p-alkylphenol resol added for the vulcanization of the rubber is, according to the invention, 5 to 59, preferably 7 to 49, in particular 10 to 39, parts by weight, based on 100 parts by weight of rubber.

According to the invention, substances, or mixtures of substances, which act as a Brønsted or Lewis acid under the reaction conditions of the vulcanization are used for the activation of the p-alkylphenol resols. Activating mixtures of substances are preferably understood as meaning systems comprising halogen-containing compounds, in particular polymers, in the presence of zinc oxide. Examples of suitable polymers of this type are poly-chloroprene (®Neoprene W), chlorobutyl rubber or chloro-sulfonate polyethylene. In the case of the activation of the vulcanization by means of halogen-containing compounds in the presence of zinc oxide, the amount of such compounds is preferably 1 to 20, in particular 2 to 10, parts by weight, based on 100 parts by weight of rubber. A part or the total amount of the required halogen-containing compounds may also originate from the rubber (halogen rubber), from the vulcanizing agent (halogen-containing p-alkylphenol resol) or from further components added for other purposes. The amount of zinc oxide is preferably 1 to 15, in particular 2 to 10, parts by weight, based on 100 parts by weight of rubber.

Alternatively, Lewis acids, for example tin chloride or zinc chloride, or organic or inorganic acids, for example phosphoric acid or p-toluenesulfonic acid, may also be added in order to activate the p-alkylphenol resols. In this case, the amount of the added Lewis or Brønsted acid is preferably 1 to 10, in particular 2 to 5, parts by weight, based on 100 parts by weight of rubber.

Preferably, a phenol resin is used as a further binder. In particular, novolaks which are obtainable in a conventional manner by condensation of phenols and aldehydes, preferably in the presence of acidic catalysts, for example ®Alnovol PN 322 (Hoechst AG), are suitable. The novolak is cured using conventional methylene group donors, for example using hexamethylenetetramine or using melamine resins, for example ®Additol XT 911 or XT 922 (Hoechst AG). Instead of the combination of novolak and curing agent, known self-curing resols may also be used. The novolaks or resols are preferably based on phenol and formaldehyde but may also contain substituted phenols or polyphenols.

The amount of the phenol resin binder which is preferably additionally used is preferably 5 to 30% by weight, in particular 10 to 20% by weight, based on the amount of the nonvolatile components used for the production of the moldings.

Further conventional components which are used in the production of heat-stable moldings by the process according to the invention are stated under the friction lining formulations mentioned at the outset. The type and amount of the additives can be adapted to the particular intended use of the moldings.

In the process according to the invention, all components used are first mixed, if necessary with the addition of a suitable solvent for one or more of the components used. Mixing is effected by means of known methods, for example by stirring and/or kneading. The mixture obtained is then molded. Conventional shaping methods are used for this purpose. For example, the mixture is introduced, if necessary under pressure, into a specified mold matrix or is rolled onto a shaped substrate. The preform obtained is then cured by vulcanization. For this purpose, it is heated to temperatures of, preferably 150° to 200° C., in particular from 160° to 180° C. Heating is continued at least until the vulcanization process is complete. In addition, the moldings may be further heated for a longer time. The shaping step and the vulcanization can be carried out in separate operations at different temperatures or, preferably, also simultaneously in one operation at temperatures of, preferably, 150° to 200° C., in particular from 160° to 180° C., by using heatable shaping tools. After cooling, the molding obtained can be aftertreated, for example in order to establish the exact shape, to cut grooves or to calender or graphite the surface.

In addition to advantages during processing, in particular as a result of the absence of the annoying odor due to sulfur compounds during the vulcanization, reversion of the rubber is also very substantially absent during the vulcanization with p-alkylphenol resols.

The mechanical properties of the moldings produced by the process according to the invention are substantially improved compared with those of conventional moldings. The rubber matrix crosslinked with p-alkylphenol resols has more than twice as large an elongation at break and a substantially higher angled-notch impact strength than the system crosslinked with sulfur. The measurement of the mechanical values on aged test specimens clearly demonstrates further advantages of vulcanization by means of p-alkylphenol resols compared with the conventional crosslinking by means of sulfur. Thus, for example, the tensile strength of the sulfur-crosslinked specimens decreases to about 76% on accelerated aging, whereas the p-alkylphenol resol-crosslinked test specimens show no decrease or even an increase thereof by about 21%.

Even more dramatic differences are found in the case of the aging-related decline in the elongation at break. This declines by about 56% in the case of the test specimens vulcanized with sulfur but only by about 13% or 30% of the initial elongation in the case of the p-alkylphenol resol-crosslinked test specimens.

Owing to their outstanding property profile, the heat-stable moldings produced by the process according to the invention can preferably be used for the production of friction linings, in particular brake linings and clutch linings, and of grinding tools.

EXAMPLES

The invention is illustrated by the examples which follow. The parts and percentages stated in the examples relate to the weight, unless stated otherwise. The exact compositions of the blend examples are shown in Table 1. The measured values determined are shown in Tables 2 and 3, and Table 3 shows the values after accelerated heat aging of the test specimens (1 hour at 150° C. and then 3 days at 100° C.).

All rubber blends are prepared on a laboratory roll mill in a conventional manner. In the first blending stage, the rubber is initially taken and fillers and halogen-containing polymers and resins are incorporated. The blending temperature is adjusted briefly to 100° C. to 110° C. In the subsequent second stage, the vulcanizer/activator system is mixed in at temperatures below 100° C. The rubber component used is a styrene/butadiene rubber (SBR) ®Buna Hüls EM 1620, which, in the form delivered, already contains 50 parts of carbon black per 100 parts of elastomer. The phenol novolak is a commercial novolak (Alnovol PN 322) having a melting range of 70° to 80° C. (capillary method DIN 53181) and a viscosity of 900 to 1250 mPa.s according to DIN 53177, measured using a 50% strength solution in 1-methoxypropan-2-ol at 23° C.

The p-alkylphenol resols
®Vulkaresen PA 105 (p-tert-octylphenol resol, Hoechst AG) and
®Vulkaresen PA 510 (p-tert-octylphenol resol, Hoechst AG),
which are likewise commercially available, are characterized as follows:

| Melting range, capillary method | Vulkaresen PA 105 | Vulkaresen PA 510 |
| --- | --- | --- |
| DIN 53181 | 55–65° C. | 57–67° C. |
| Methylol value | 9–12% | 6–9% |

The first blend example described below serves as a comparative experiment with a sulfur-crosslinked matrix, whilst Examples 1 and 2 according to the invention represent matrices vulcanized with the aid of p-alkylphenol resols and having improved mechanical properties.

TABLE 1

| | Matrix blends | | |
| --- | --- | --- | --- |
| | Comparison | Example 1 | Example 2 |
| Buna Hüls EM 1620 (2/3 Styrene-butadiene rubber/⅓ carbon black) | 150 parts | 150 parts | 150 parts |
| Neoprene W (Polychloroprene) | — | 5 parts | 5 parts |

TABLE 1-continued

| | Matrix blends | | |
| --- | --- | --- | --- |
| | Comparison | Example 1 | Example 2 |
| Zinc oxide | 5 parts | 5 parts | 5 parts |
| Stearic acid | 2 parts | — | — |
| Alnovol PN 322 (Phenolnovolak) | 18 parts | 18 parts | 18 parts |
| Vulkaresen PA 105 (p-tert-octyl-phenol resol) | — | 30 parts | — |
| Vulkaresen PA 510 (p-tert-octyl-phenol resol) | — | — | 30 parts |
| Sulfur | 10 parts | — | — |
| Hexamethylene-tetramine | 2 parts | 2 parts | 2 parts |
| Benzothiazyl-2-cyclo-hexylsul-fenamide | 1.5 parts | — | — |

TABLE 2

Measured values, determined using unaged samples, test specimens all vulcanized for 60 minutes at 180° C.

| | | Comparison | Example 1 | Example 2 |
| --- | --- | --- | --- | --- |
| *Mooney-Plasticity ML (1 + 4) 120° C. | [MU] | 33 | 32 | 28 |
| Tensile strength (DIN 53504) | [MPa] | 17 | 16 | 14 |
| Elongation at break (DIN 53504) | [%] | 48 | 112 | 320 |
| Shore A hardness (DIN 53505) | [U] | 92 | 91 | 88 |
| Angled-notch impact strength | [N/mm] | 14 | 20 | 32 |

*measured using the unvulcanized blend

TABLE 3

Measured values, determined after heat aging (1 hour at 150° C. and 3 days at 100° C.) of the test specimens.

| | | Comparison | Example 1 | Example 2 |
| --- | --- | --- | --- | --- |
| Tensile strength (DIN 53504) | [MPa] | 13 | 16 | 17 |
| Elongation at break (DIN 53504) | [%] | 21 | 97 | 223 |
| Shore A hardness (DIN 53505) | [U] | 94 | 92 | 91 |
| Angled-notch impact strength | [N/mm] | 13 | 19 | 27 |

We claim:
1. A process for the production of heat-stable moldings by molding and vulcanizing a mixture containing a natural or synthetic rubber in the presence of a sulfur-free vulcanizer/activator system comprising 5 to 59 parts by weight of p-($C_4$–$C_{10}$)-alkylphenol resols, per 100 parts by weight of rubber, as vulcanizer which contain at least 90 mol % of p-($C_4$–$C_{10}$)-phenols, based on the total amount of phenols, and a mixture of 1 to 20 parts by weight of halogen-containing polymers and 1 to 15 parts by weight of zinc oxide, per 100 parts by weight of rubber, as the activator at a temperature of 120° to 250° C.

2. The process as claimed in claim 1, wherein the synthetic rubbers used are styrene/butadiene rubbers and/or copolymers of butadiene and acrylonitrile.

3. The process as claimed in claim 1, wherein the amount of the rubber binder is 8 to 50% by weight, based on the amount of the nonvolatile components used for the production of the molding.

4. The process as claimed in claim 1, wherein some of the methylol groups of the p-alkylphenol resols are halogenated.

5. The process as claimed in claim 1, wherein phenol resins are used as further binders.

6. The process as claimed in claim 1, wherein an amount of 5 to 30% by weight, based on the amount of the nonvolatile components used for the production of the molding, of a phenol novolak is used as the further binder.

7. The process as claimed in claim 1, wherein shaping and vulcanization are carried out simultaneously at a temperature of 150° to 200° C.

8. The process as claimed in claim 1 wherein the alkylphenols are selected from the group consisting of p-hexylphenol, p-tert.-octylphenol, p-(2-ethylhexyl)-phenol and p-nonyl phenol.

* * * * *